Oct. 1, 1929.  J. MARTIN  1,729,663
FRAME FOR TRAVELING GOODS CARRIERS
Filed Feb. 29, 1928
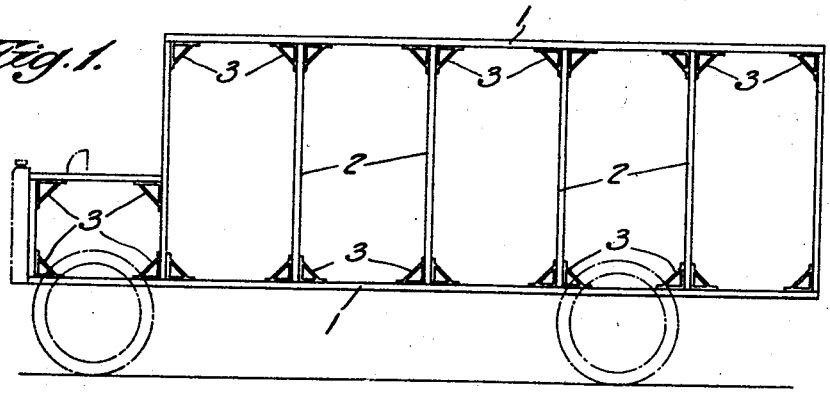
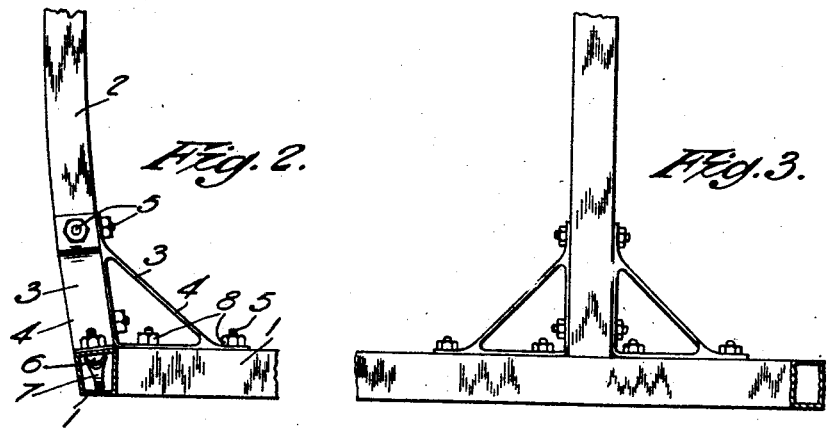
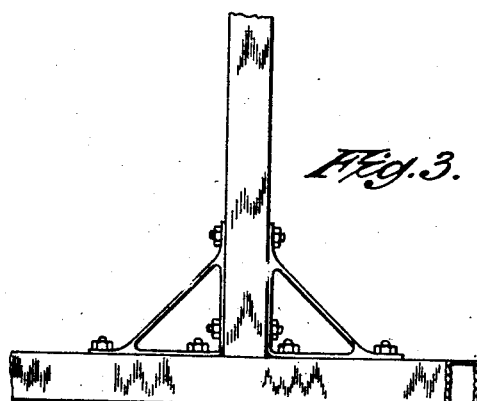
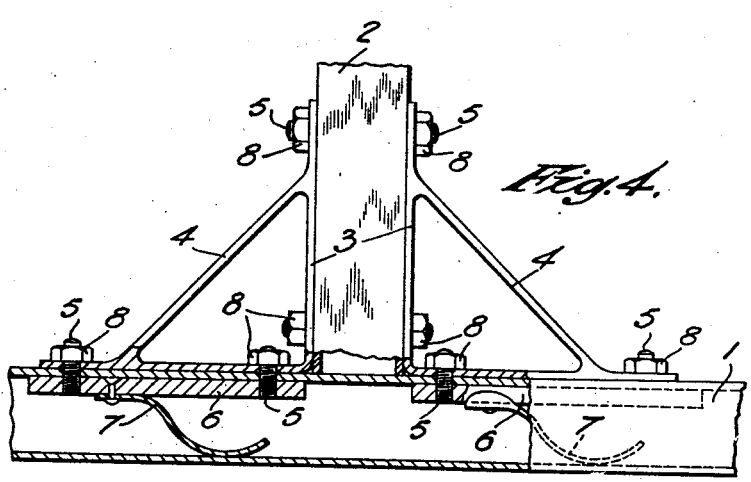
INVENTOR
JAMES MARTIN.
PER:
ATTORNEYS.

Patented Oct. 1, 1929

1,729,663

UNITED STATES PATENT OFFICE

JAMES MARTIN, OF LONDON, ENGLAND

FRAME FOR TRAVELING GOODS CARRIERS

Application filed February 29, 1928, Serial No. 257,914, and in Great Britain March 3, 1927.

This invention relates to an improved construction and method of constructing vehicle body frames, aircraft fuselage frames and other conveyors for transporting goods. The object of my invention is to provide a strong rigid metal frame which will be light and cheap to produce.

According to the invention the horizontal and vertical frame members of a vehicle or other conveyor body frame are of box section metal, the ends of the vertical members abutting against the horizontal members, corner brackets, having bracing members disposed diagonally across their limbs, being secured to the upper and lower ends of the vertical frame members and to the horizontal frame members.

The frame members are of hollow rectangular section, and the ends of the vertical members are trued off to abut neatly against the horizontal members. The corner brackets are composed of lengths of bar metal brought to the required L-shape before fitting them against the sides of the vertical and horizontal frame members. Diagonal stays are welded or otherwise secured across the ends of the brackets to ensure rigidity and strength, and the brackets are secured at predetermined positions marked along the horizontal members, studs or bolts preferably being employed for securing the brackets to the vertical and horizontal frame members, the studs or bolts being passed through the brackets into the box section frame members. The location of the stud or bolt holes is marked on the frame members by suitable templets, and the brackets have holes to register with these holes.

The studs or bolts are carried by metal bars which are slid along the interior of the box section frame members, each said bar carrying a curved leaf spring abutting against an inner wall of the selected frame member and having a tendency to press the studs or bolts through the frame members, consequently when the studs or bolts carried by a bar come opposite the stud or bolt holes in a frame member they will project through such holes and registering holes in a bracket, nuts then being applied to secure the bracket. The brackets can be secured in position as the holes are prepared, that is to say, the required number of stud holes for securing one bracket will be formed adjacent one end of a frame member, the stud carrying member pushed along the inside of the frame member until the studs project through the frame member, and the bracket applied. The holes for the next bracket will then be prepared, the next stud carrying member introduced into the frame member until the studs project through the holes and the next bracket applied. By this means it is only necessary to mark off the proper places for the brackets and stud holes and the whole structure can be quickly built up step by step.

My invention will be more clearly understood by reference to the accompanying drawings which illustrate an embodiment of same, and wherein:—

Fig. 1 is a side elevation showing my invention applied to a motor vehicle body.

Fig. 2 is a part sectional end view showing my invention applied to a curved vertical side frame member.

Fig. 3 is a side elevation of a straight vertical frame member secured to a like horizontal frame member, and Fig. 4 is a part sectional side elevation showing how the stud carrying members are located.

Referring to the drawings the frame shown is of rectilinear form but its configuration may be modified, for instance to conform with the requirements of an aeroplane fuselage.

The frame consists of longitudinal and transverse horizontal metal members 1 connected by vertical metal members 2. These members are of box section and the ends of the vertical members 2 are trued off to fit flush against the horizontal members. The points of engagement of the vertical members with the horizontal members are predetermined by suitable markings and L-shaped brackets 3 secured to register with these points so that as far as possible each vertical frame member is secured between a pair of brackets 3 as shown in Figs. 3 and 4.

Each bracket 3 is strengthened by a stay 4 which can be secured after the bracket has been brought to the requisite angle to fit snugly against the selected frame members 1 and 2. Templets can be employed to obtain a proper location and angle of the brackets 3.

The brackets 3 are firmly secured to the frame members 1 and 2 by studs 5 carried by metal bars 6 inserted in the frame members. The bars 6 have stud holes formed in them at points the same distance apart as corresponding holes in the frame members and brackets so that by first affixing the studs 5 to the bars 6, the bars can be slid along the interior of the frame members until the studs register with the stud holes prepared in the frame members for them, and the studs pressed up through the holes in the frame members. This can be effected by engaging the bar 6 in the end of a tube or holder and pushing the bar along the interior of the frame member with the studs pressing against the side of the frame member having the stud holes. This pressure can be obtained by fitting to each bar 6 one or more curved leaf springs 7 adapted to ride with a fair amount of pressure over the side of the frame member opposite to the side containing the stud holes. The bar 6 may be positioned laterally by the tube or holder in which it is engaged. This holder may have portions to engage the inner side faces of the box section members.

The bars 6 are preferably of segmental or semi-circular section, their flat faces fitting against the walls of the frame members.

In practice the brackets are built up to a standard angle and shape and are then trued up accurately by grinding upon each face and upon one or both sides. The stud holes are then drilled to templet or in a jig to ensure accurate placing. This will ensure interchangeability, ease of erection and a correct fit of the parts against each other.

If desired, a roughened, grooved or serrated surface may be arranged between the faces of the brackets and the frame members to increase the friction between them and thus relieve the bolts of shearing stresses. This may be effected by using a thin strip of steel having a roughened or serrated surface on both sides, which is inserted between the two faces of the brackets and the frame members or the brackets or frame members may themselves be so roughened or serrated.

As shown in Fig. 2, when a vehicle or other body frame has curved or partially curved sides, the longitudinal frame members 1 can have their outer sides shaped to be continuous with the vertical frame members, the brackets 3 being shaped to fit flush against the frame members.

My invention is applicable to quite a large variety of vehicle and other bodies, and is particularly suitable for the conventional form of chassis for open or closed bodies of motor vehicles where it is desired to have simplicity of structure with lightness and great strength.

I claim:—

A vehicle frame comprising a plurality of box section metal frame members forming a skeleton frame, a plurality of brackets for securing said frame members together, bolt holes in said frame members and brackets, elements inside said frame members, bolts anchored to said elements for projecting through said bolt holes, springs fixed to said elements for pressing same against the walls of said frame members, and nuts engageable on said bolts for clamping said brackets to said elements.

JAMES MARTIN.